Figure 1:
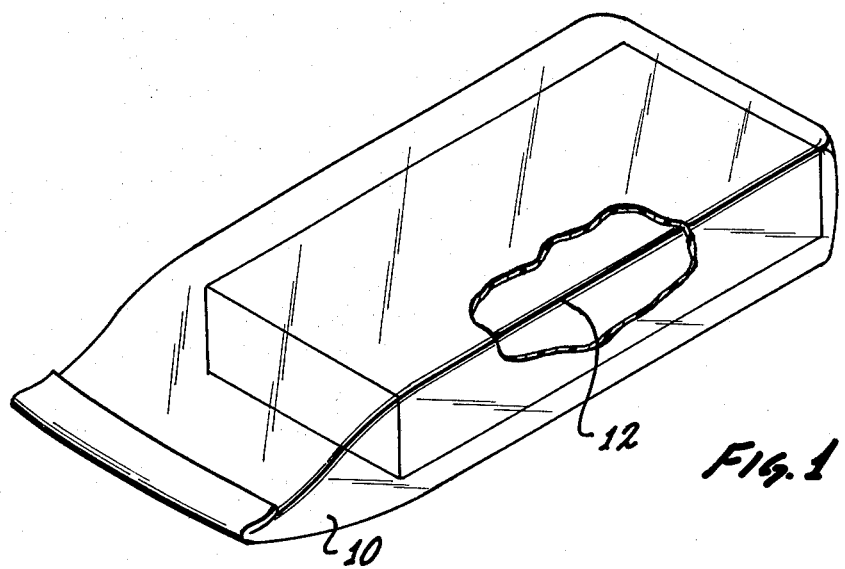

United States Patent [19]

Lybrand

[11] 4,393,159
[45] Jul. 12, 1983

[54] ANTI-STATIC MATERIAL AND METHOD OF MAKING THE MATERIAL

[75] Inventor: William Lybrand, Northridge, Calif.

[73] Assignee: Bengal, Inc., Sepulveda, Calif.

[21] Appl. No.: 327,470

[22] Filed: Dec. 4, 1981

[51] Int. Cl.³ .............................................. C09K 3/16
[52] U.S. Cl. ........................... 524/243; 260/DIG. 16; 260/DIG. 19; 260/DIG. 21; 523/105; 523/112; 524/430; 524/437; 524/451; 525/333.7; 525/360; 525/370; 525/369
[58] Field of Search ............... 524/243, 910, 912, 913, 524/395, 398, 583, 528, 451, 430, 437; 525/333, 335, 379, 380, 360, 370, 333.7; 260/DIG. 16, DIG. 19, DIG. 21

[56] References Cited

U.S. PATENT DOCUMENTS

| | | | |
|---|---|---|---|
| 2,992,199 | 7/1961 | Coler et al. | 260/DIG. 16 |
| 3,223,664 | 12/1965 | Conlon | 260/DIG. 16 |
| 3,223,695 | 12/1965 | Gallaugher | 524/910 |
| 3,299,006 | 1/1967 | Tomiyama et al. | 524/912 |
| 3,365,437 | 1/1968 | Marra et al. | 524/587 |
| 3,435,021 | 3/1969 | Rombusch et al. | 524/587 |
| 3,445,396 | 5/1969 | Funatsu et al. | 524/249 |
| 3,478,096 | 11/1969 | Cyba | 524/243 |
| 3,485,786 | 12/1969 | Rombusch et al. | 524/243 |
| 3,575,903 | 4/1971 | Rombusch et al. | 524/247 |
| 3,631,162 | 12/1971 | McGaugh et al. | 524/247 |
| 3,658,744 | 4/1972 | Brindell et al. | 260/DIG. 19 |
| 3,745,116 | 7/1973 | Brindell et al. | 260/DIG. 15 |
| 3,867,315 | 2/1975 | Tigner et al. | 524/587 |
| 3,975,325 | 8/1976 | Long | 524/913 |
| 4,147,742 | 4/1979 | Castro et al. | 524/223 |
| 4,210,556 | 7/1980 | Castro et al. | 528/212 |
| 4,247,498 | 1/1981 | Castro | 264/49 |
| 4,314,040 | 2/1982 | Castro et al. | 525/391 |

FOREIGN PATENT DOCUMENTS

| | | | |
|---|---|---|---|
| 50-2753 | 1/1975 | Japan | 524/587 |
| 519448 | 8/1976 | U.S.S.R. | 524/243 |

*Primary Examiner*—Ronald W. Griffin
*Attorney, Agent, or Firm*—Ellsworth R. Roston; Charles H. Schwartz

[57] ABSTRACT

A thermoplastic material formed from a hydrocarbon chain is modified to inhibit the production of static charges. The thermoplastic material may be a polypropylene. A weak salt having properties of ionizing and having its positive ions bond chemically to the thermoplastic material is mixed in the thermoplastic material. A chemical agent is also dispersed in the thermoplastic material and is provided with properties of facilitating the dispersion of the positive ions of the weak salt throughout the thermoplastic material for chemical bonding to the thermoplastic material. The chemical agent may also be bonded chemically to the thermoplastic material. The weak salt may be cupric acetate and the chemical agent may be an ethoxylated amine when the thermoplastic material is polypropylene. The polypropylene is preferably mixed with a suitable material such as polyethylene to enhance the amorphous characteristics of the thermoplastic material. The chemical bonding occurs primarily to the portion of the thermoplastic material having the amorphous characteristics.

The material of this invention may be formed as bags or as sheets. The material may be formed by mixing the different chemicals and extruding the mixture under conditions of controlled temperatures and pressures and for controlled dwell times. Preferably the material is not vented to the atmosphere during the extrusion operation.

31 Claims, 2 Drawing Figures

ANTI-STATIC MATERIAL AND METHOD OF MAKING THE MATERIAL

This invention relates to anti-static materials and to methods of producing such materials. More particularly, the invention relates to materials produced by a mixture of thermoplastic materials formed from hydrocarbon chains and of modifying components to inhibit the formation of anti-static charges on or in such thermoplastic materials. The invention also relates to methods of producing such modified thermoplastic materials. The invention is particularly concerned with the inhibition of static charges in polypropylene.

Polypropylene has certain desirable properties. For example, polypropylene is impervious to a wide variety of oils, acids and solvents. It is also transparent, or at least translucent, and it has good clarity and a high surface gloss. It has excellent temperature resistance to temperatures as high as 280° F. It is non-toxic and has a low water-vapor transmission. Because of these advantages, articles made from polypropylene have a wide variety of uses. For example, polypropylene is formed into articles to store food. Polypropylene is also formed into casings and covers to store electrical equipment in environments where the equipment may otherwise be subjected to harsh chemicals. Polypropylene may also even be used to form carpeting or garments for clean rooms.

Articles made from polypropylene have certain critical disadvantages. One such critical disadvantage is that the articles tend to accumulate static charges. Such static charges limit the functionability of the articles since they tend to accumulate dust. Such dust is undesirable when the polypropylene articles are storing food. Such dust and static charges are also undesirable when the polypropylene is formed into casings or covers for electrical equipment since electrical arcing tends to occur. The electrical equipment is accordingly unpredictable in operation and actually may not operate properly at times. The static charges also tend to produce arcing to any person trying to touch the polypropylene articles. This is uncomfortable and sometimes even dangerous.

The accumulation of static charges and dust on articles made from polypropylene has been recognized as a serious problem for many years. During this period of time, a considerable effort has been made to overcome such problem. In spite of such effort, the problem has continued to plague manufacturers and suppliers of articles made from polypropylene. For example, polypropylene articles have either tended to accumulate static charges or have been so altered in properties as to lose the advantages of polypropylene over other thermoplastic materials.

This invention provides polypropylene articles in which the accumulation of static charges is inhibited. The invention includes chemical components which are added to the polypropylene to reduce the electrical resistivity of the polypropylene to a value which still causes the polypropylene to be electrically insulating while producing a leakage of electrical charges which tend to accumulate on a static basis on or in the polypropylene. The modified polypropylene constituting this invention is uniform throughout its volume so that the ability of the modified polypropylene to dissipate electrical charges continues indefinitely without any degradation in the properties of the modified polypropylene.

In one embodiment of the invention, a thermoplastic material formed from a hydrocarbon chain is modified to inhibit the production of static charges. The thermoplastic material may be a polypropylene. A weak salt having properties of ionizing and having its positive ions bond chemically to the thermoplastic material is mixed in the thermoplastic material in a relatively small proportion. A chemical agent is also dispersed in the thermoplastic material and is provided with properties of facilitating the dispersion of the positive ions of the weak salt throughout the polypropylene for chemical bonding to the polypropylene. The chemical agent may also be bonded chemically to the polypropylene. The weak salt may be cupric acetate and the chemical agent may be an ethoxylated amine when the thermoplastic material is polypropylene. The polypropylene is preferably mixed with a suitable material such as polyethylene to enhance the amorphous characteristics of the thermoplastic material. The chemical bonding ocurs primarily to the portion of the thermoplastic material having the amorphous characteristics.

The material of this invention may be formed as bags or as sheets. The material may be formed by mixing the different chemicals and extruding the mixture under conditions of controlled temperatures and pressures and for controlled dwell times. Preferably, the materials are not vented to the atmosphere during the extrusion operative.

Figure 2:
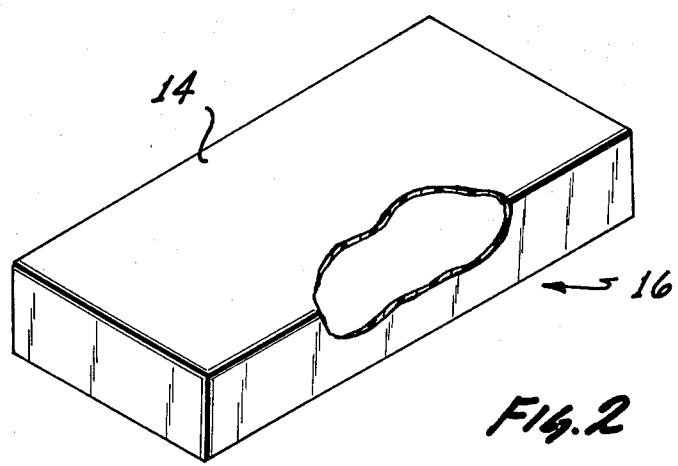

In the drawings:

FIG. 1 is a perspective view, partially broken away, of a first embodiment of the invention; and FIG. 2 is a perspective view, partially broken away, of a second embodiment of the invention.

In one embodiment of the invention, a thermoplastic material constituting a polymer formed from long hydrocarbon chains is adapted to be modified to cause the material to be anti-static. The thermoplastic material may be a polypropylene. The thermoplastic material normally has an electrical resistivity of at least $10^{11}$ ohms. When the thermoplastic material has such a high electrical resistivity, it tends to accumulate static charges. However, when the material is modified to provide an electrical resistivity less than $10^9$ ohms, any static charges forming in the material tend to be dissipated. The modified material of this invention is particularly advantageous because it provides an electrical resistivity in the order of $10^7$ to $10^9$ ohms depending upon the humidity of the atmosphere. This resistivity provides for a dissipation of static charges while still causing the thermoplastic material to provide an electrical insulation.

The thermoplastic material of this invention is preferably a polypropylene. The polypropylene may have a relatively low melt index such as to approximately 5 or it may have a relatively high melt index such as in the range of 5 to 12. Polypropylene with a melt index to approximately five (5) is desirable for use in vacuum forming and extruding articles. Polypropylene with an intermediate melt index (five (5) to twelve (12)) is desirable for use in injection molding articles.

The polypropylene may be modified by the materials and methods of this invention to reduce its electrical resistivity to the desired range of values and may then be formed as bags of thin film for holding electrical equipment or food or other articles. The modified polypropylene may also be formed into sheets to serve as casings and covers for electrical equipment or food or other articles.

Certain materials are added to the polypropylene to modify the electrical characteristics of the polypropylene. For example, a weak salt having properties of ionizing is mixed with the polypropylene. The weak salt may be cupric acetate. When the weak salt is heated, it tends to ionize and the positive ions (the cupric ions) tend to vaporize and migrate through the polyethylene. As the ions migrate, they tend to form chemical bonds with the carbon atoms in the polyethylene. The chemical bonds formed tend to be double bonds. These double bonds are advantageous because they are stronger than a single bond and provide a greater electrical conductivity through the material than the single bond.

Amines are also mixed with the polyethylene to form the modified material of this invention. The amines have properties of flowing and mixing and blending well with polypropylene. Since the amines are hydrocarbon derivatives, they tend to become locked to the polypropylene structures. The amines also serve as a dispersant for the cupric ions and facilitate the chemical bonding of the cupric ions to the polypropylene to produce an ionic path through the polypropylene. The amines also have a tendency to be bonded chemically to the polypropylene.

When polypropylene having a low melt index is used, the polypropylene preferably has a melt index to a value of approximately 5. A melt index at the low end of the range is desirable because the polypropylene tends to be more amorphous at lower melt indexes than at higher melt indexes. The provision of amorphous characteristics in the polypropylene is desirable because it facilitates the chemical bonding between the cupric ions and the carbon atoms in the polypropylene and between the ethoxylated amines and the carbon atoms in the polypropylene.

During the formation of the articles from polypropylene, the cupric ions become gaseous and migrate through the polypropylene mixture. The cupric ions tend to become bonded chemically to the carbon ions in the polypropylene. The chemical bonding between the cupric ions and the carbon atoms in the polypropylene even tend to constitute double bonds. Such bonding tends to provide the polypropylene with sufficient electrical conductivity to dissipate electrical charges while still retaining the polypropylene as an electrical insulator.

The amount of cupric acetate in the polypropylene may be approximately 0.005% to 0.01% by weight in the mixture. Preferably the amount of cupric acetate in the mixture is between 0.005% and 0.007% by weight in the mixture. If the amount of cupric acetate in the mixture is excessive, the mixture will tend to be acidic. This is undesirable because the polypropylene may tend to corrode any metals which it may contact. If the amount of cupric acetate in the mixture is insufficient, the polypropylene will not satisfactorily dissipate all of the static electricity accumulated on or in the polypropylene. For example, the resistivity of the articles formed from the polypropylene mixture may be as low as $10^7$ ohms when the cupric acetate is included in the mixture in an amount of 0.01% by weight.

The amount of cupric acetate included in the mixture is related somewhat directly to the melt index of the mixture. For example, cupric acetate in an amount of approximately 0.005% is desirable when the melt index is relatively low (less than 5) and cupric acetate in an amount of approximately 0.007% is desirable when the melt index is relatively high (a melt index of 5 to 12).

The cupric acetate tends to become bonded to the polypropylene because of the amorphous properties of the polypropylene. The amorphous properties of the polypropylene tend to decrease as the melt index of the polypropylene increases. This may explain why the amount of cupric acetate used is increased as the melt index of the polypropylene is increased. The amorphous properties of the polypropylene tend to facilitate the production of double bonds between the carbon ions in the polypropylene and the cupric ions.

Ethoxylated amines are included in the mixture. Ethoxylated amines have properties of flowing well through the polypropylene and blending well with the polypropylene. This is particularly true since both the amines and the polypropylene constitute hydrocarbon derivatives. The amines also tend to become locked to the carbon atoms in the polypropylene structure. The amines also have properties of facilitating the chemical bonding between the cupric ions and the carbon atoms in the polypropylene. In this way, the amines facilitate the dissipation through the polypropylene of the static charges which tend to accumulate on or in the polypropylene.

The ethoxylated amines may be included in the polypropylene in a concentration of approximately two percent (2%) to two and seven tenths percent (2.7%) by weight. If insufficient amine is included in the polypropylene, the polypropylene will not dissipate the static charge at a satisfactory rate. If excessive amine is included in the polypropylene, the polypropylene will tend to feel greasy or oily.

The amount of the ethoxylated amine included in the mixture is also somewhat divertly related to the melt index of the polypropylene. For example, when the melt index of the polypropylene is relatively low (less than 5), the amount of the ethoxylated amine included in the mixture may be in the range of two percent (2%) to two and four tenths percent (2.4%). However, when the melt index of the polypropylene is in the intermediate range (5 to 12), the ethoxylated amine may be included in the mixture in a range of two percent (2%) to two and seven tenths percent (2.7%).

The use of ethoxylated amines is desirable because such amines facilitate the production of an amorphous structure in the polypropylene. An amorphous condition in the polypropylene is desirable because the polypropylene tends to have lengthened polymeric chains with double bonds. This is advantageous in providing a chemical bonding of the carbon atoms in the polypropylene with the cupric ions, particularly double bonding with the cupric ions. It is also advantageous because the amines also tend to become bonded to the carbon atoms in the polypropylene.

When ethoxylated amines are used with the polypropylene, the amines tend to disperse throughout the polypropylene rather then being concentrated as a wax at the surface of the polypropylene. Furthermore, the density of the polypropylene tends to decrease slightly with the addition of the cupric acetate and the ethoxylated amines. This may result from the fact that the amorphous properties of the polypropylene tend to increase. It may also result in part from the generation of an increased amount of gases from the cupric acetate. This is one reason why the concentration of the cupric acetate in the polypropylene of relatively high melt index is greater than the concentration of the cupric acetate in the polypropylene of low melt index.

Slip agents are preferably not included in the mixture. A slip agent is not desirable because it contributes a greasy feel to the polypropylene. This could tend to make the polypropylene excessively greasy or slippery since a greasy feel is also provided in the mixture by the ethoxylated amine.

If any blocking agent is included in the mixture, it preferably is in very small amounts. For example, a blocking agent may be included in the mixture in an amount of one (1) part per million (1,000,000) by weight. A blocking agent is desirable in the mixture because it inhibits any wrinkling or crinkling of the material constituting this invention. However, an excessive amount of the blocking agent may tend to make the surface of the material slippery, particularly in view of the inclusion of the amines in the mixture.

A suitable material such as polyethylene is preferably included in the mixture. The polyethylene preferably has a relatively low specific gravity because such a polyethylene is more amorphous than a polyethylene having a high specific gravity. The polyethylene is included in the mixture to enhance the amorphous characteristics of the mixture. In effect, the polyethylene tends to form a copolymer with the polypropylene. This facilitates the chemical bonding of the copper and oxygen ions to the carbon ions in the mixture.

The amount of polyethylene included in the mixture is preferably in the order of five percent (5%) to ten percent (10%) by weight. The amount of polyethylene included in the mixture is related somewhat directly to the melt index of the polypropylene since the crystalline properties of the polypropylene tend to increase with increases in the melt index of the polypropylene. For example, polypropylene having a low melt index (less than 5) may be about five percent (5%) more amorphous than polypropylene of relatively high melt index (5 to 12).

Certain materials may be added to the mixture to provide a flame retardant (a material in which the flame is self extinguishing when the external flame is removed). These include antimony oxide and alumina trihydrate. Antimony oxide may be added to the mixture to a percentage of twelve percent (12%) by weight to provide the resultant articles with the ability to withstand a temperature as high as 150° C. The antimony oxide forms oxides resistant to burning when the articles made from the mixture are subject to heat. Alumina trihydrate may be added to the mixture in a percentage of approximately seven percent (7%) to twelve percent (12%) by weight to provide articles made from the mixture with an ability to withstand temperatures as high as 150° C. The alumina trihydrate attracts moisture when the article burns and the moisture extinguishes the flame. Decabromodiphenyl oxide may also be used as a flam retardant. However, since this material is relatively expensive, other flame retardants are preferred.

A neutral filler material such as talc may also be included in the material of this invention in a range of twenty percent (20%) to forty percent (40%) by weight. The neutral filler material acts to retard the shrinkage during the molding operation. In this way, the tolerances of the dimensions of the articles produced from the materials of this invention can be closely controlled.

Various substitutions may be made for the materials discussed above. For example, silver nitrate can be substituted for cupric acetate. When such a substitution is made, the amount of silver nitrate used is relatively low, and actually significantly lower than the amount of cupric acetate. However, even when silver nitrate is used in such small relative quantities, the cost would be quite high. Other metallic salts such as salts of tin, iron, calcium and iridium may be used. Such metals are desirable to provide a double bond to the carbon atoms in the polypropylene and the polyethylene.

Other materials may also be substituted for the ethoxylated amines. For example, high grade mineral oil may be included in the mixture to a percentage of approximately one percent (1%) by weight. When mineral oil is used, slip agents and anti-blocking agents are preferably not included in the mixture.

All of the materials discussed above are advantageous because they have FDA approval and do not pose any safety threats to the customers and users of the articles formed by this invention. This is particularly true of the copper acetate, ethoxylated amine and polyethylene constituting the primary materials added to the polypropylene to form the articles of this invention.

The discussion above has related to polypropylene with melt indexes to a value of approximately twelve (12). Polypropylene with melt indexes greater than a value of approximately twelve (12) are also available. Polypropylene with such high melt indexes is not as desirable for use in this invention as polypropylene with melt indexes below a value of approximately twelve (12). Polypropylene with such high melt indexes are not desirable because they have to be worked at such high temperatures that the properties of the materials added in accordance with this invention tend to become destroyed. This may result from the fact that the polypropylene with such high melt indexes tends to be excessively crystalline.

The materials of this invention may be mixed and then extruded by the use of a conventional extruder. During the extrusion, the temperature of the material should preferably not exceed a limit such as approximately 415° F. to 420° F., which constitutes the melting temperature of polypropylene. Preferably, the operating temperature is in the range of 360° F. to 415° F. The pressure on the material should preferably not exceed a limit such as approximately two thousand pounds per square inch (2000 lb./sq.in.) when the extruder is not vented. However, pressures as high as three thousand per square inch (3000 lb./sq.in.) may be used when the polypropylene has a low melt index.

Preferably, the extruder is not vented. This forces the gases to migrate through the material and remain in the material so that the copper ions in the copper acetate and the oxygen ions in the amines can be combined with the carbon ions in the polypropylene. This is particularly important because of the relatively low amounts of the copper acetate and the ethoxylated amines included in the mixture.

The dwell time on the material during the extrusion preferably has a limit such as approximately twelve (12) to twenty (20) minutes. This dwell time can be attained, if necessary, by disposing screens to partially block the flow of the material from the extruder. The dwell time should be properly regulated because an excessive dwell time will cause the material to become scorched.

The modified polypropylene formed by this invention may be used in a wide variety of different applications. For example, the material may be formed into bags 10 (FIG. 1) for holding electrical equipment 12. The modified polypropylene may also be formed into sheet material 14 for rigid containers 16 (FIG. 2). The materials may also be used in food packaging, particularly when it is desired to make the food package transparent or at least translucent and to provide the package with a high surface gloss. The material may also be used for carpeting, for garments for clean rooms and medical applications such as tubing and other elements for the transmission of blood and intravenous fluids.

The articles formed from the materials of this invention have certain important advantages. For example, the articles have resistivities in the order of $10^7$ to $10^9$ ohms. These sensitivities are sufficiently high to make the articles electrically insulating. However, the resistivities are sufficiently low to prevent static from accumulating on such articles. Since the articles do not accumulate static, they inhibit the accumulation of dust. This is important when the articles are used in electrical equipment or used to store food. The articles also are impervious to water, acids and other chemicals, are non-toxic and are resistant to temperatures as high as 280° F.

Although the invention has been described with reference to a particular embodiment, it is to be appreciated that various adaptations and modifications may be made which will be apparent to persons skilled in the art. The invention is only to be limited by the appended claims.

I claim:

1. In combination for eliminating static charges by providing resistivities in the range of approximately $10^7$ to $10^9$ ohms,
   polypropylene
   a salt in which the positive ion is selected from a group consisting of copper, silver, tin, iron, calcium and iridium, the salt being mixed in the polypropylene in the range of approximately 0.005% to 0.01% by weight, and
   ethoxylated amines mixed in the polypropylene in the range of approximately 2.0% to 2.7% by weight.

2. The combination set forth in claim 1 wherein a filler is mixed in the polypropylene in the range of 20% to 40% by weight.

3. The combination set forth in claim 1 wherein polyethylene is mixed in the polypropylene in the range of approximately 5% to 10% by weight.

4. The combination set forth in claim 1 wherein a flame retardant is mixed in the polypropylene in the range of approximately 7% to 12% by weight.

5. The combination set forth in claim 4 wherein the salt is copper acetate and the flame retardant is selected from a group consisting of antimony oxide and aluminum trihydrate.

6. The combination set forth in claim 1 wherein the polypropylene has a melt index to approximately 5 and the ethoxylated amine is mixed in the polypropylene in a range of approximately 2.0% to 2.4% by weight.

7. The combination set forth in claim 1 wherein the polypropylene has a melt index between approximately 5 and 12.

8. The combination set forth in claim 1 wherein a blocking agent is included in the mixture in a percentage of approximately 1 part per million by weight and talc is mixed as a filler in the mixture in the range of 20% to 40% by weight.

9. In combination for eliminating static charges by providing resistivities in the range of approximately $10^7$ to $10^9$ ohms,
   polypropylene including carbon ions,
   a weak salt of a metal selected from a group consisting of copper, silver, tin, iron, calcium and iridium,
   a chemical agent having properties of facilitating the dispersion of the positive ions throughout the polypropylene for chemical bonding to the carbon ions in the polypropylene, the chemical agent being selected from a group consisting of an ethoxylated amine and mineral oil and being mixed in the polypropylene in the range to approximately 2.7% by weight, and
   polyethylene mixed in the polypropylene in the range of approximately 5% to 10% by weight.

10. The combination set forth in claim 9, including, the weak salt constituting copper acetate in the range of approximately 0.005% to 0.01% by weight.

11. The combination set forth in claim 10 wherein there is approximately one (1) part by weight of a blocking agent in the polypropylene to approximately one million (1,000,000) parts by weight of the polypropylene.

12. The combination set forth in claim 11 wherein the polypropylene has a melt index to approximately 5 and the chemical agent is an ethoxylated amine and has a range in the polypropylene of approximately 2.0% to 2.4% by weight.

13. The combination set forth in claim 9 wherein the polypropylene has a low melt index to approximately 5, and
the weak salt is a cupric acetate with a percentage by weight in the mixture of five thousandths of a percent (0.005%) to seven thousandths of a percent (0.007%), and
the chemical agent is an ethoxylated amine with a percentage by weight in the mixture of approximately two percent (2%) to two and four tenths percent (2.4%).

14. The combination set forth in claim 9 wherein the polypropylene has a melt index of approximately 5 to 12,
the weak salt is a cupric acetate with a percentage by weight in the mixture of five thousandths of a percent (0.005%) to ten thousandths of a percent (0.010%), and
the chemical agent is an ethoxylated amine with a percentage by weight in the mixture of approximately two percent (2%) to two and seven tenths percent (2.7%).

15. The combination set forth in claim 9 wherein the chemical agent is a mineral oil with a percentage by weight in the mixture of approximately 1%.

16. In combination for eliminating static charges by providing a resistivity in the range of approximately $10^7$ to $10^9$ ohms,
   a polypropylene having a melt index to approximately 12,
   copper acetate dispersed throughout the polypropylene in a range of approximately 0.005% to 0.01% by weight and having cupric ions chemically bonded to the polypropylene,
   an ethoxylated amine dispersed throughout the polypropylene in a range of approximately 2.0% to 2.7% by weight and facilitating the dispersion of the cupric acetate in the polypropylene and the chemical bonding of the copper ions to the polypropylene, and
   a filler in the range of 20% to 40% by weight.

17. The combination set forth in claim 16 wherein polyethylene having a relatively low specific gravity is included in a range of approximately 5% to 10% by weight.

18. The combination set forth in claim 16 wherein a flame retardant in a range to approximately 12% by weight is included in the polypropylene.

19. The combination set forth in claim 16 wherein the polypropylene has a melt index of approximately five (5) to twelve (12), and
the copper acetate has a weight of approximately 0.007% and
the ethoxylated amine has a concentration by weight of approximately two percent (2%) to two and seven tenths percent (2.7%) in the polypropylene.

20. The combination set forth in claim 16 wherein a blocking agent having a percentage by weight of approximately one (1) part per million (1,000,000) is included.

21. The combination set forth in claim 20 wherein the polypropylene has a melt index to a value of approximately five (5), and
the copper acetate has a percentage by weight of approximately five thousandths of a percent (0.005%), and
the ethoxylated amine has a percentage by weight of approximately 2% to 2.4%.

22. The combination set forth in claim 16 wherein the filler is talc.

23. A method of making anti-static material having a resistivity in the range of approximately $10^7$ to $10^9$ ohms, including the following steps:
mixing polypropylene including carbon ions, a weak salt having a percentage by weight in the range of approximately 0.005% to 0.01% and having positive ions selected from a group consisting of copper, silver, tin, iron, calcium and iridium and having properties of producing chemical bonds between the carbon ions in the polypropylene and the positive ions in the salt, and a chemical agent having a percentage by weight in the range to approximately 2.7% and selected from a group consisting of an ethoxylated amine and a mineral oil, and
extruding the mixture of the polypropylene, the weak salt and the chemical agent at a controlled temperature less than approximately 420° F. and a controlled pressure less than approximately 3000 psi and with a controlled dwell time less than approximately twenty (20) minutes.

24. The method set forth in claim 23 wherein the weak salt is cupric acetate and
the chemical agent is an ethoxylated amine having a range by weight in the order of approximately 2.0% to 2.7%.

25. The method set forth in claim 24 wherein a filler material is included in the mixture in the range of 20% to 40% by weight.

26. The method set forth in claim 24 wherein polyethylene having a relatively low specific gravity is added to the mixture before the extrusion operation in the range of approximately 5% to 10%.

27. The method set forth in claim 26 wherein the polypropylene has a low melt index to approximately 5,
the copper acetate has a percentage by weight of approximately five thousandths of a percent (0.005%) to seven thousandths of a percent (0.007%), and
the ethoxylated amine has a percentage by weight in the range of approximately two percent (2%) to two and four tenths percent (2.4%).

28. The combination set forth in claim 27 wherein talc is included in the combination in a range of twenty percent (20%) to forty percent (40%) by weight.

29. The method set forth in claim 26 wherein the polypropylene has a melt index between approximately five (5) and twelve (12),
the ethoxylated amine has a percentage by weight in the range of approximately two percent (2%) to two and seven tenths percent (2.7%),
the copper acetate has a percentage by weight in the range of approximately five thousandths of a percent (0.005%) to approximately ten thousandths of a percent (0.010%).

30. The combination set forth in claim 29 wherein talc is included in the combination in a range of twenty percent (20%) to forty percent (40%) by weight.

31. The combination set forth in claim 24 wherein a flame retardant is included in the mixture in the range to approximately 12%.

* * * * *